United States Patent

[11] 3,623,059

| | | | | |
|---|---|---|---|---|
| [72] | Inventor | Calvin P. Rickerd | | |
| | | La Grange Park, Ill. | | |
| [21] | Appl. No. | 878,717 | | |
| [22] | Filed | Nov. 21, 1969 | | |
| [45] | Patented | Nov. 23, 1971 | | |
| [73] | Assignee | International Harvester Company | | |
| | | Chicago, Ill. | | |

[54] SHAFT MONITOR CIRCUIT
2 Claims, 1 Drawing Fig.

[52] U.S. Cl. .................................................... 340/271,
340/213, 340/332
[51] Int. Cl. ................................................... G08b 21/00
[50] Field of Search ........................................... 340/263,
271, 267, 213, 213.1, 332

[56] References Cited
UNITED STATES PATENTS

| | | | |
|---|---|---|---|
| 2,462,655 | 2/1949 | McHenry ..................... | 340/271 |
| 2,565,323 | 8/1951 | Quinn............................ | 340/213 UX |
| 2,769,970 | 11/1956 | Kratville....................... | 340/213 X |
| 3,084,338 | 4/1963 | Mauer et al................... | 340/213.1 |
| 3,128,457 | 4/1964 | Culbertson.................... | 340/213.1 |
| 3,267,453 | 8/1966 | Braun............................ | 340/332 X |
| 3,456,251 | 7/1969 | Smith et al.................... | 340/213.1 |

Primary Examiner—John W. Caldwell
Assistant Examiner—Michael Slobasky
Attorney—Floyd B. Harman ABSTRACT: Monitor circuit wherein a plurality of signal means responsive to malfunctions, such as failure of rotation of shafts of a combine or the like at the proper speed, are arranged to energize indicator lamps and to also energize, through unidirectional conduction devices, an alarm means such as a horn. The horn alerts the operator that a shaft is not operating properly and one of the indicator lamps locates the particular shaft.

PATENTED NOV 23 1971 3,623,059
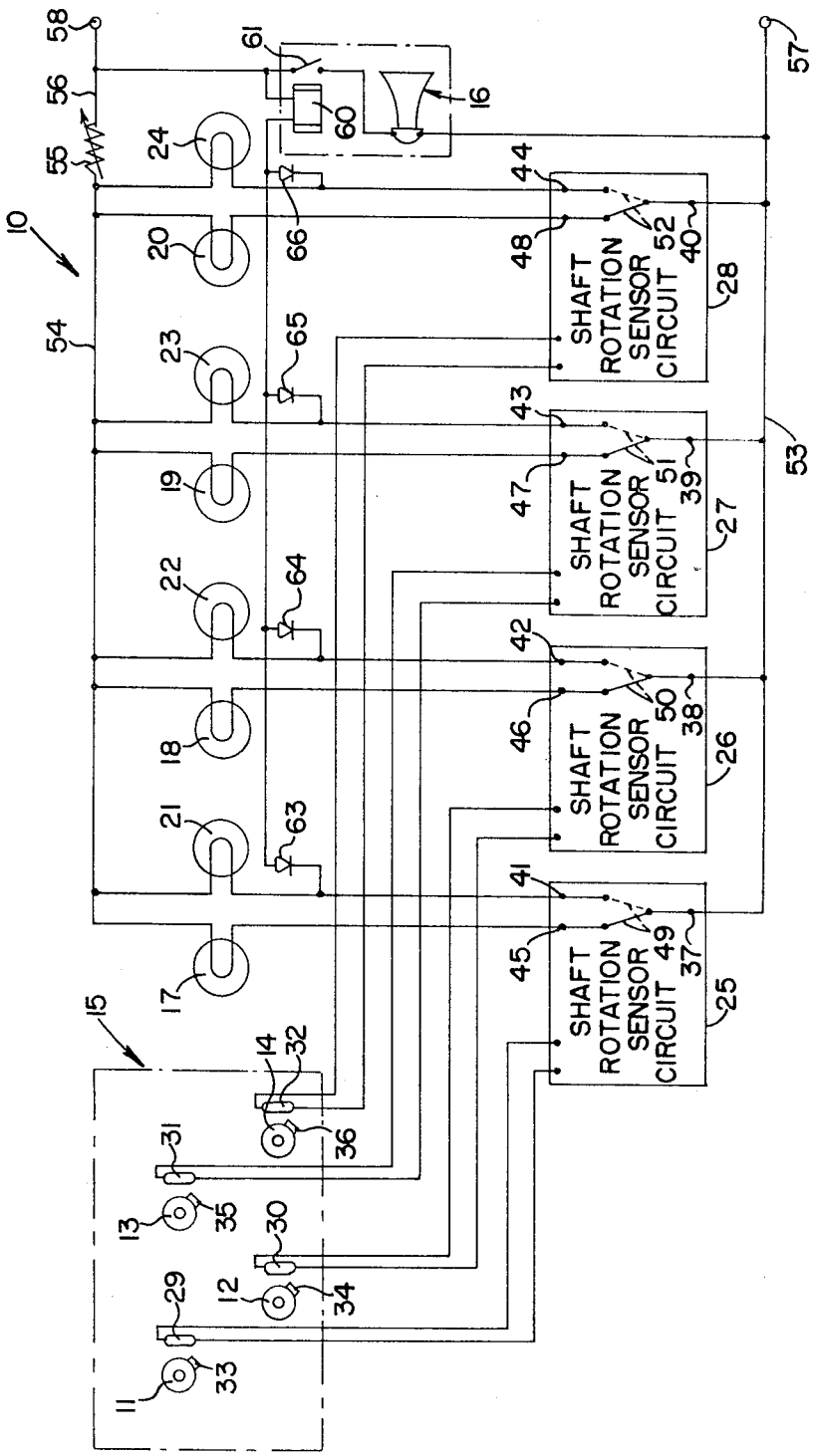
INVENTOR
CALVIN P. RICKERD
BY
*[signature]* ATT'Y.

> 3,623,059

SHAFT MONITOR CIRCUIT

BACKGROUND OF THE INVENTION

This invention relates to a monitor circuit and more particularly to a monitor circuit in which an alarm is energized when any one of a plurality of malfunctions occur and in which the particular malfunction is separately indicated. The circuit is very simple in construction and operation and is inexpensive, using a minimum number of component parts, while being trouble-free in operation and highly reliable.

The circuit of this invention has many applications, but was especially designed for use with a machine such as a combine, having a number of shafts which perform various functions and wherein the failure of rotation of one of such shafts can escape attention and lead to serious problems including damage to the machine. Highly reliable signal means have been designed for developing a signal in response to failure of proper rotation of a shaft, but monitoring circuits for use in conjunction with such signal means have been unduly complex and expensive and not always reliable.

This invention was evolved with the general object of overcoming the disadvantages of prior art circuits and of providing a comparatively simple and inexpensive and yet highly reliable monitor circuit.

SUMMARY

According to this invention, a pair of terminals and each of a plurality of signal means are interconnected in response to the existence of a certain operating condition to connect indicator means, such as an indicator light, inserted between voltage supply lines, one terminal of each signal means being connected to one supply line and the second terminal of the signal means being connected through the indicator means to the second supply line. In addition, the second terminals of the signal means are connected through unidirectional conduction devices and through alarm means, which may include a horn or other audible signal means, to the second supply line. An important advantage of the circuit is that the operation of any one signal means energizes only the indicator means associated therewith while energizing the alarm means. Thus, a horn can be sounded to alarm an operator to a malfunction while an indicator light indicates the cause of the malfunction. Another important advantage of the circuit is that the alarm means and the indicator means are energized through current flow paths which are independent, so that an open circuit in the indicator means will not prevent operation of the alarm means. In addition, substantially the flow supply voltage can be applied to the alarm means to further insure a high degree of reliability. Such advantages are obtained using signal means with only two inter-connectable terminals and with a very simple circuit arrangement having a minimum number of component parts.

According to a specific feature of the invention, each signal means includes a third terminal interconnected with the one terminal when the one terminal is disconnected from the second terminal thereof, and a second plurality of indicator means are connected between the second supply line and such third terminals of the signal means. The second plurality of indicator means are preferably in the form of indicator lights and can be used to indicate normal or proper operation.

Another specific feature is in the provision of adjustable rheostat means for adjusting the energization of the indicator lamps to control lamp brilliance for operation in bright sunlight or for operation at night.

The circuit is especially advantageous when used to monitor the operation of shafts of a combine or the like, in which the operation of various portions of the machine cannot be readily monitored visually from the operator's cab. The horn can be located in the cab to alert the operator that a shaft is not rotating properly and the operator can then look at the indicator lights, also indicated in the cab, to immediately determine which shaft is not rotating properly.

This invention contemplates other objects, features and advantages which will become more fully apparent from the following detailed description taken in conjunction with the accompanying drawing in which the signal figure shows a shaft monitor circuit constructed according to the invention.

BRIEF DESCRIPTION OF THE DRAWING

The FIGURE is a schematic diagram of a shaft monitor circuit constructed in accordance with the principles of this invention.

DESCRIPTION OF THE PREFERRED

Reference numeral 10 generally designates the shaft monitor circuit constructed in accordance with the principles of this invention. The circuit 10, as diagrammatically illustrated, is used to monitor the rotation of four shafts 11, 12, 13 and 14 of a machine 15 which may be a combine or the like. The circuit, as illustrated, comprises an audible signal means, which may preferably include a horn 16, and indicator means, which may preferably include eight indicator lamps 17–24. The horn 16 and lamps 17–24 may preferably be located in the operator's cab. When the shafts 11–14 are rotating properly, the lamps 17–20 are energized and the lamps 21–24 are deenergized, the horn 16 being also deenergized. If any one of the shafts 11–14 stops rotating or rotates at less than a certain speed, the horn 16 is energized and one of the lamps 17–20 is deenergized while one of the lamps 21–24 is energized to indicate the particular shaft which is not functioning properly. For example, if the shaft 11 rotates at less than a certain speed, the lamp 17 is deenergized and the lamp 21 is energized while the horn 16 is also energized. Thus, the operator receives an audible signal that there is a malfunction and by looking at the lamps, he can locate the particular shaft which gives rise to the malfunction. Preferably, the lamps 17–20 are green while the lamps 21–24 are red.

To control energization of the horn 16 and lamps 17–24. four shaft rotation sensor circuits 25–28 are provided which, as illustrated, are respectively connected to magnetic reed switches 29–32, located in proximity to the path of rotation of permanent magnets 33–36 carried by the shafts 11–14. The circuits 25–28 include "first" terminals 37–40, "second" terminals 41–44 and "third" terminals 45–48.

The magnetic reed switches 29–32 apply signals to the circuits 25–28 at rates proportional to the speed of rotation of the shafts 11–14. When the shafts are rotating above certain predetermined speeds, the "first" terminal of each circuit is connected to the "third" terminal thereof. When, however, one of the shafts 11–14 rotates at below a certain speed, the "first" terminal of the corresponding circuit is disconnected from the "third" terminal and is connected to the "second" terminal.

The details of construction of the circuits 25–28 form no part of the present invention and are therefore not included. For a complete disclosure of circuits of this type, reference may be made to the copending application of Herbert R. Schoenbach, Ser. No. 840,649, filed on July 10, 1969. The interconnection of the terminals may be accomplished by movable contacts 49–52, as diagrammatically illustrated, the illustrated full line position being those in which the shafts are rotating properly and the dotted line positions being those in which the shafts are rotating at below certain speeds. Contacts 49–52 may be the contacts of a relay or, in the alternative, the interconnection of the terminals may be accomplished by means of transistors or the like.

The "first" terminals 37–40 are connected to a line 53. The "second" terminals 41–44 are connected through the lamps 21–24 to a line 54 which is connected through a rheostat 55 to a line 56. The "third" terminals 45–48 are connected through the lamps 17–20 to the line 54. Lines 53 and 56 are connected to terminals 57 and 58 which are connected to a suitable voltage source which may preferably be a DC source although an AC source could be used. Rheostat 55 is adjustable to adjust the voltage applied to the lamps, to provide sufficient, but not excessive lamp brightness for different operating conditions. It will be noted that only four lamps are energized at any one time. When any one of the lamps 17–20 is deenergized, a corresponding one of the lamps 21–24 is energized.

The audible signals may preferably include a relay 60 energizable to close a contact 61 in series with the horn 16 between the supply lines 53 and 56. Relay 60 has one terminal connected to the line 56 and a second terminal connected through unidirectional conduction devices in the form of diodes 63–66, to the "second" terminals 41–44 of the circuits 25–28. When the "second" terminal of any of the circuits is interconnected with the "first" terminal thereof, current can flow from the supply line 56 through the relay 60 and through one of the diodes 63–66 and the path through the sensor circuit to the line 53, thus energizing the relay 60 to close the contact 61 and to energize the horn 16. It may be noted that the horn 16 or another form of signal means could be connected between supply line 56 and the anodes of diodes 63–66, thus eliminating the relay.

It is noted that the current flow paths through the alarm circuit and the indicator circuits are independent. An open circuit in any of the indicator circuits, such as caused by the burning out of a lamp, for example, will not prevent operation of the alarm. In addition, substantially the full supply voltage can be applied to the alarm circuit to minimize the required sensitivity and to further insure a high degree of reliability. Such advantages are obtained with a very simple and inexpensive circuit arrangement, having a minimum number of component parts.

It will be understood that modifications and variations may be effected without departing from the spirit and scope of the novel concepts of this invention.

What is claimed is:

1. In a monitor circuit, a plurality of signal means each having first, second and third terminals, said first terminal being disconnected from said second terminal and connected to said third terminal in response to a predetermined satisfactory operating condition and being connected to said second terminal and disconnected from said third terminal in response to an operating condition different from said predetermined satisfactory operating condition, first and second supply lines connectable to a voltage source, a third line, said first terminals of said signal means being connected to said first supply line, a first plurality of lamps having first terminals respectively connected to said second terminals of said signal means and having second terminals connected to said third line, a second plurality of lamps having first terminals respectively connected to said third terminals of said signal means and having second terminals connected to said third line, alarm means having first and second terminals, a plurality of unidirectional conduction devices respectively between said second terminals of said signal means and said first terminal of said alarm means, means connecting said second terminal of said alarm means to said second supply line, and adjustable rheostat means connecting said third line to said second supply line for energizing those of said second plurality of lamps corresponding to signal means in said satisfactory operating condition and those of said first plurality of lamps corresponding to signal means in a different operating condition, said rheostat means being adjustable to adjust the current through the energized lamps.

2. In a monitor circuit as defined in claim 1, said signal means comprising means responsive to rotation of separate shafts of a combine or the like, each signal means being operative to interconnect said first and second terminals thereof when the speed of rotation of the associated shaft drops below a certain predetermined speed and to interconnect said first and third terminals thereof when the speed of rotation of the associated shaft is above said certain predetermined speed.

* * * * *